United States Patent Office 3,351,628
Patented Nov. 7, 1967

3,351,628
1-ETHYL-4,5-DI-(PARA-METHOXYPHENYL)-
IMIDAZOLE AND A SALT THEREOF
Adrian Marxer, Muttenz, Switzerland, assignor to Ciba Corporation, New York, N.Y., a corporation of Delaware
No Drawing. Filed Oct. 15, 1964, Ser. No. 404,185
Claims priority, application Switzerland, Oct. 23, 1963, 12,956/63; Feb. 28, 1964, 2,505/64; Aug. 26, 1964, 11,162/64
2 Claims. (Cl. 260—309)

ABSTRACT OF THE DISCLOSURE

The invention relates essentially to 4,5-di-(p-methyl- or methoxy-phenyl)-imidazoles which are 1-substituted by a methyl or an ethyl group. Also included are the salts of these compounds. The subject matter of the invention is indicated to be useful as analgesics.

---

The present invention relates to new imidazoles. Especially it concerns 4,5-diaryl-imidazoles of the general formula

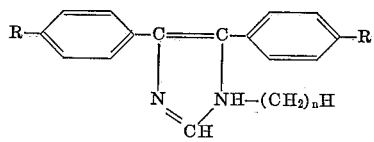

I in which the symbols R represent methyl radicals which may be bound through an oxygen atom and $n$ stands for 1 or 2, and their salts.

The new compounds possess valuable pharmacological properties, more especially an analgesic effect. Thus, for example, they produce in animal tests analgesia, for example in mice or rats. They may be used as analgesics and also as intermediates, for example for the manufacture of pharmacologically valuable substances.

There may be especially mentioned 1-methyl-4,5-di-(para-methoxyphenyl)-imidazole and 1-methyl-4,5-di-(para-tolyl)-imidazole.

The new compounds are prepared in known manner; preferably, the radical of the formula —$(CH_2)_n$—H is introduced into a 4,5-diaryl-imidazole of the general formula

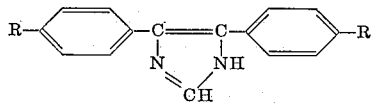

II in which the radicals R have the means given above, by reaction with a reactive ester of an alcohol of the formula $H(CH_2)_n$—OH.

Reactive esters are above all esters with strong inorganic or organic acids, such as sulfuric acid, a hydrohalic acid, for example hydrochloric, hydrobromic or hydriodic acid, or an arylsulfonic acid, such as benzene-sulfonic or toluenesulfonic acid. It is advantageous to use the imidazole for the reaction in the form of a metal salt thereof, for example one of its alkali metal salts such as the sodium or potassium salt or of a silver salt thereof; alternatively, the reaction is carried out in the presence of a condensing agent capable of forming such salts, for example in the presence of a hydroxide, amide or hydride of an alkali metal, for example sodium hydride.

The reaction referred to above is carried out in the usual manner, preferably in the presence of a solvent or diluent, at room temperature or with cooling or heating.

Depending on the reaction conditions and starting materials used the final products are obtained in the free form or in the form of their salts which are likewise included in the present process. The salts of the new compounds can be converted into the free bases in the known manner, for example by treatment with a basic agent, such as an alkali or an ion exchange resin. On the other hand, resulting free bases can form salts with organic or inorganic acids. The salts are preferably formed with therapeutically useful acids, for example a hydrohalic, sulfuric, phosphoric, nitric or perchloric acid; an aliphatic carboxylic acid such as acetic acid; an aliphatic, alicyclic, aromatic or heterocyclic sulfonic acid, such as methanesulfonic, ethanesulfonic, hydroxyethanesulfonic, ethylenesulfonic acid; halogenbenzenesulfonic, toluenesulfonic or naphthalenesulfonic acids.

These salts and other salts of the new compounds, for example the picrates, can also be used for purifying the free bases obtained, by converting the free bases into salts, isolating the salts and liberating the base from the salt. In view of the close relationship between the new compounds in the free form and in the form of their salts, what has been said above and is being said below concerning the free bases refers similarly to the corresponding salts wherever this applies.

The invention includes also any modification of the process in which an intermediate obtainable at any stage of the process is used as starting material and any remaining step/steps is/are carried out, or in which the starting materials are formed under the reaction conditions, or in which the reactants are used in the form of their salts.

The starting materials are known or, if new, they can be prepared by known methods.

The new compounds may be used, for example, in the form of pharmaceutical preparations containing them in the free form or if desired in the form of their salts in admixture or conjunction with a pharmaceutical organic or inorganic, solid or liquid excipient suitable for enteral, parenteral or local administration. Suitable are substances that do not react with the new compounds, for example water, gelatine, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be, for example, tablets, dragees, capsules, ointments or creams, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain further therapeutically valuable substances. The pharmaceutical preparations are formulated in the known way.

The new compounds may also be used in the form of feeding stuffs or as additives to feeding stuffs, with the use, for example, of the conventional extenders and diluents or feeding stuffs respectively.

The following examples illustrate the invention.

Example 1

A suspension of 56.1 g. of 4,5-di-(para-methoxyphenyl)-imidazole in 250 cc. of absolute toluene is mixed with 10 g. of a 50% suspension of sodium hydride in paraffin. The whole is heated and stirred for 2 hours in an oil bath maintained at 115° C., then cooled at room temperature, and a solution of 28.5 g. of methyl iodide in 50 cc. of absolute toluene is dropped in. The batch is refluxed for 3 hours, cooled, mixed with water and ether, and extracted with 200 cc. of 2 N-hydrochloric acid. The hydrochloric acid extract is alkalinized with an alkali solution and agitated with ether+benzene 1:1, and the solvent is evaporated, whereupon the residue gradually crystallizes, to yield 1-methyl-4,5-di-(para-methoxyphenyl)-imidazole of the formula

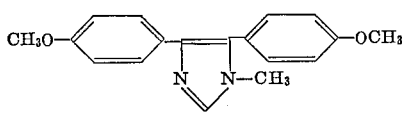

melting at 125 to 128° C. By recrystallization from isopropanol the melting point is raised to 131–133° C.

From the free base the hydrochloride can be prepared in the following manner:

A solution of 58 g. of 1-methyl-4,5-di(para-methoxyphenyl)-imidazole in 150 cc. of ethyl acetate is mixed with 80 cc. of 2.5 N-alcoholic hydrochloric acid and crystallization is initiated by adding another 200 cc. of ethyl acetate. The 1-methyl-4,5-di(para-methoxyphenyl)-imidazole hydrochloride thus formed melts at 178 to 180° C.

Using the same method, the hydrochloride may be obtained in a modification melting at 207–209° C. The hydrochloride may be further purified by recrystallization from a mixture of methanol and ethyl acetate. Both modifications when reacted with sodium hydroxide solution and recrystallized from isopropanol yield the same base melting at 131–133° C.

Example 2

When in the above example methyl iodide is replaced by 25.2 g. of dimethylsulfate and the reaction is performed under otherwise identical conditions, 1-methyl-4,5-di-(para-methoxyphenyl)-imidazole is likewise obtained.

Example 3

56.1 g. of 4,5-di-(para-methoxyphenyl)-imidazole in 150 cc. of alcohol are mixed with a solution of 4.6 g. of sodium in 100 cc. of alcohol and the whole is evaporated to dryness under vacuum. The residue is suspended in 250 cc. of absolute benzene and mixed with 28.5 g. of methyl iodide in 50 cc. of benzene. The batch is refluxed for 3 hours, then cooled and worked up as described in Example 1. The resulting 1-methyl-4,5-di-(para-methoxyphenyl)-imidazole melts at 131 to 133° C. and is identical with the compounds described in Examples 1 and 2.

Example 4

A suspension of 28.03 g. of 4,5-di-(para-methoxyphenyl)-imidazole in 250 cc. of absolute toluene is mixed with 5.5 g. of a 50% suspension of sodium hydride in paraffin, and the whole is refluxed for 3 hours in an oil bath at 120° C. The resulting thick magma is cooled to 25° C. and 11.0 g. of ethyl bromide in 20 cc. of toluene are dropped in. The whole is kept for 15 minutes at room temperature, heated for 15 minutes in a bath maintained at 50° C. and finally for 2 hours in a bath maintained at 120° C. The batch is cooled, mixed with water, diluted with ether, twice agitated with water and three times with 100 cc. of 2 N-hydrochloric acid. The hydrochloric acid extract is alkalinized with 65 cc. of 10 N-sodium hydroxide solution and the precipitated oil is taken up in ether and twice washed with water. The ether is evaporated and 1-ethyl-4,5-di-(para-methoxyphenyl)-imidazole of the formula

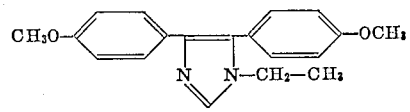

is obtained in the form of an oil which after a prolonged period forms crystals melting at 80 to 82° C.

The above base is dissolved in 75 cc. of acetone, 40 cc. of about 2.7 N-alcoholic hydrochloric acid are added, and 1-ethyl-4,5-di-(para-methoxyphenyl)-imidazole hydrochloride is caused to crystallize by adding ether; it melts at 190 to 191° C.

Example 5

24.8 g. of 4,5-di-(para-tolyl)-imidazole are suspended in 125 cc. of absolute toluene, the suspension treated with 5.5 g. of sodium hydride in the form of a 50% paste in paraffin, and the mixture refluxed for 2 hours in an oil bath of 120° C. The batch is cooled to room temperature, then 15.0 g. of methyl iodide in 20 cc. of absolute toluene are added dropwise, the whole then heated to 50° C., and afterwards heated in an oil bath of 120° C. for 3 hours. The solution is cooled, water and ether are added, and the organic phase extracted several times with a total of 300 cc. of 2 N hydrochloric acid. The hydrochloric acid extract is treated with 50 cc. of 10 N sodium hydroxide solution, and the oil which precipitates is taken up in ether. The ethereal solution is washed with water, and the ether evaporated. 1-methyl-4,5-di-(para-tolyl)-imidazole of the formula

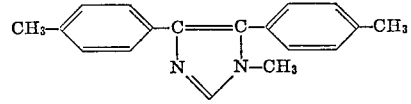

is obtained in the form of crystals melting at 132–135° C.

The hydrochloride in the form of crystals melting at 107–113° C. can be precipitated from the solution of the base in 4 times the quantity of ethyl acetate, adding alcoholic 2.5 N-hydrochloric acid until an acid reaction is reached, and adding the ten-fold quantity of ether.

Example 6

Tablets containing 100 mg. of 1-methyl-4,5-di-(para-methoxyphenyl)-imidazole hydrochloride may be prepared, for example, with the following ingredients:

| Per tablet: | Mg. |
|---|---|
| 1-methyl-4,5-di-(para-methoxyphenyl)-imidazole hydrochloride | 100.0 |
| Wheat starch | 136.0 |
| Colloidal silicic acid with hydrolyzed starch | 15.0 |
| Gelatine | 3.0 |
| Arrowroot | 25.0 |
| Stearic acid | 9.0 |
| Talc | 12.0 |
| | 300.0 |

METHOD 1-methyl-4,5 - di - (para-methoxyphenyl)-imidazole hydrochloride is homogeneously mixed with two-thirds of the wheat starch and two-thirds of the colloidal silicic acid with hydrolyzed starch and the mixture passed through a sieve having a 0.5 mm. mesh. Gelatine is dissolved in ten times its quantity of water, one-third of the wheat starch is suspended in double the quantity of water and pasted on a water-bath. The powder mixture is evenly moistened with the solutions of the binding agents and kneaded until a plastic mass is formed. The latter is passed through a sieve having a 3 mm. mesh, dried at a maximum temperature of 45° C. and then passed through a sieve having a 1.5 mm. mesh. To the resulting granulate there are added the arrowroot, stearic acid, talc and one-third of the colloidal silicic acid with hydrolyzed starch in a finely sieved form and, after the batch has been homogeneously mixed, it is compressed in the conventional manner into scored tablets, weighing 300 mg. and having a diameter of 10 mm.

What is claimed is:
1. 1-ethyl-4,5-di-(para-methoxyphenyl)-imidazole.
2. An acid addition salt of the compound claimed in claim 1.

References Cited

Beilstein's Handbuch der Organischen Chemie, 4th Ed., vol. 23, p. 256, Berlin, Springer, 1936.

Bredereck et al.: Chem. Ber., vol. 92, pp. 338–43 (1959).

Gompper: Chem. Ber., vol. 89, pp. 1762–8 (1956).

Novelli: Chem. Abst., vol. 34, cols. 1659–60 (1940).

WALTER A. MODANCE, *Primary Examiner.*

N. TROUSOF, *Assistant Examiner.*